United States Patent [19]

Kondo

[11] Patent Number: 4,579,899
[45] Date of Patent: Apr. 1, 1986

[54] POLYURETHANE HAVING IMPROVED CONDUCTIVITY

[75] Inventor: Kanemitsu Kondo, Toyota, Japan

[73] Assignee: Toyota Jidosha Kabushiki Kaisha, Toyota, Japan

[21] Appl. No.: 669,372

[22] Filed: Nov. 8, 1984

[30] Foreign Application Priority Data

Nov. 11, 1983 [JP] Japan .................. 58-212085

[51] Int. Cl.$^4$ .................. C08K 5/16; C08G 18/28
[52] U.S. Cl. .................. 524/198; 528/44; 528/52; 528/67; 528/486; 528/492
[58] Field of Search .................. 528/492, 67, 486, 52, 528/44; 524/198

[56] References Cited

U.S. PATENT DOCUMENTS

| | | | |
|---|---|---|---|
| 2,041,733 | 5/1936 | Werntz | 524/198 |
| 2,852,483 | 9/1958 | Mason | 524/198 |
| 3,277,098 | 10/1966 | Merten | 524/198 |
| 3,503,934 | 3/1970 | Chilvers | 260/75 |
| 3,635,907 | 1/1972 | Schulze et al. | 260/77.5 |
| 4,038,304 | 7/1977 | Kazama et al. | 260/468 E |
| 4,055,548 | 10/1977 | Carleton et al. | 260/77.5 |
| 4,123,413 | 10/1978 | Mark et al. | 524/198 |
| 4,156,064 | 5/1979 | Falkenstein et al. | 528/492 |
| 4,169,175 | 9/1979 | Marans et al. | 528/44 |
| 4,242,488 | 12/1980 | Stanley et al. | 528/44 |
| 4,415,693 | 11/1983 | Chen et al. | 524/198 |

FOREIGN PATENT DOCUMENTS 2065149  6/1981  United Kingdom ........ 524/198

Primary Examiner—Herbert S. Cockeram
Attorney, Agent, or Firm—Oblon, Fisher, Spivak, McClelland & Maier

[57] ABSTRACT

A polyurethane containing an oligomer of a molecular weight of at most 5,000, which has at least either urethane or urea bonds, is terminated with inactive groups and does not have any group reactive with alcoholic hydroxyl and isocyanate groups of raw materials for urethane preparation in its molecule, at most in an amount not to cause deterioration of the desired characteristics of the polyurethane. The polyurethane of the present invention generates less static electricity than the polyurethane of the prior art and can be easily coated by electrostatic deposition.

9 Claims, 3 Drawing Figures

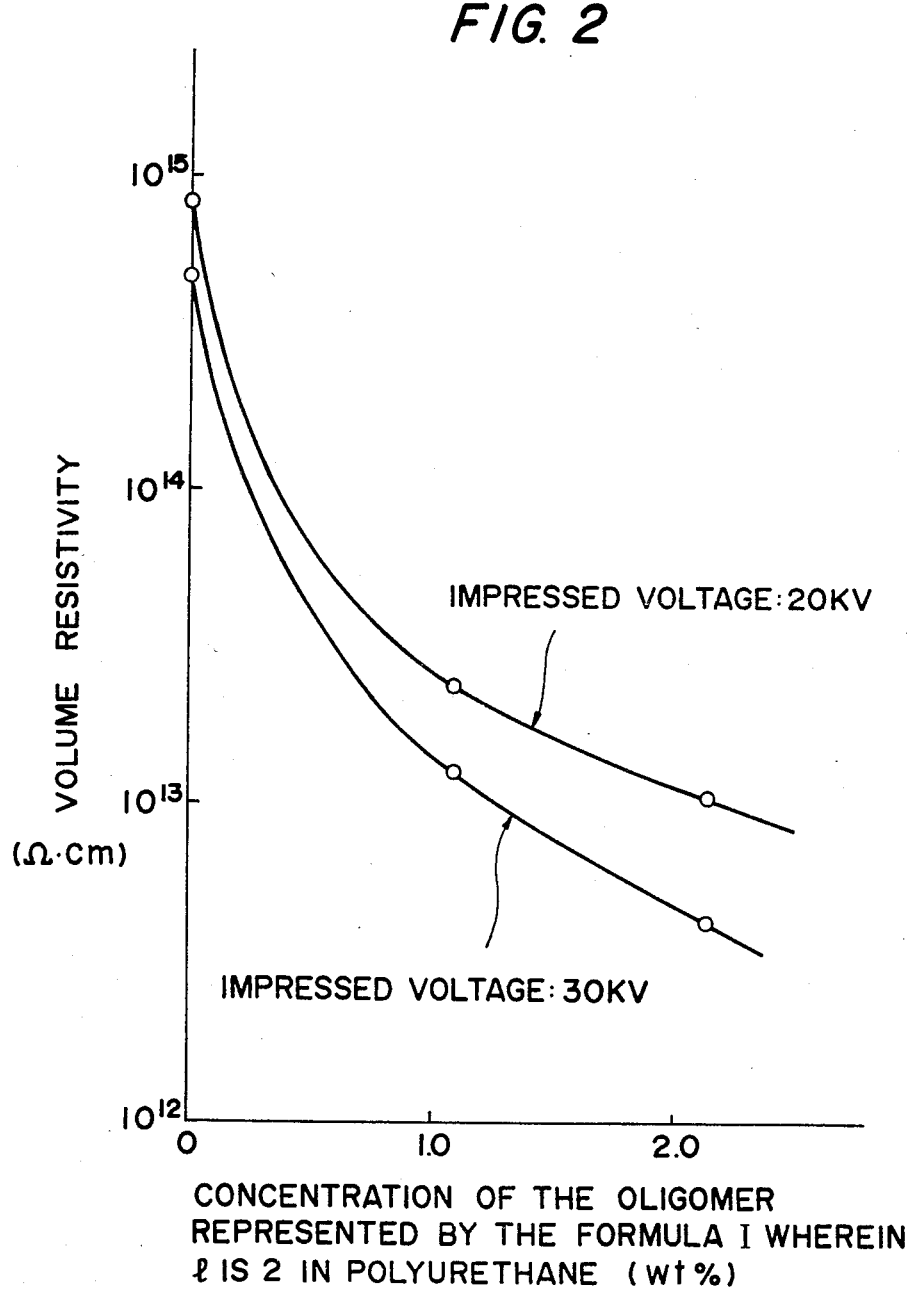

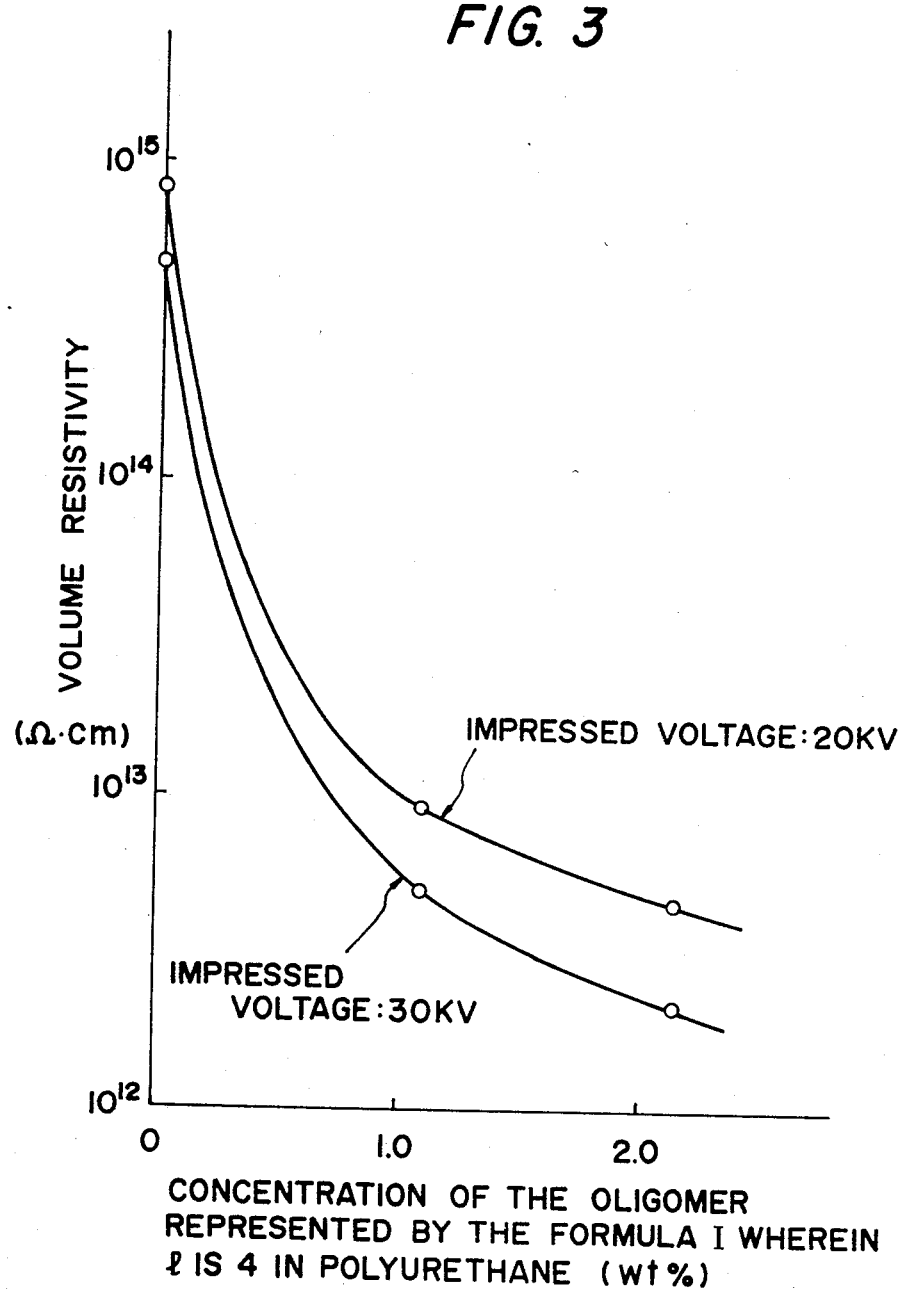

POLYURETHANE HAVING IMPROVED CONDUCTIVITY

BACKGROUND OF THE INVENTION

1. Field of the Invention

The present invention relates to a polyurethane having a markedly enhanced electrical conductivity.

2. Description of the Prior Art

Generally, polyurethane has a disadvantage in that it tends to be electrostatically charged and generate static electricity, because it has a low conductivity. Additionally, a polyurethane molding which needs to be coated can not be coated by electrostatic deposition.

The inventor of the present invention has investigated how to improve the conductivity of polyurethane, and has found that the conductivity can be enhanced with an increase in the content of a urethane oligomer of a molecular weight of from 5,000 to several tens of thousands in the polyurethane, said oligomer being essentially contained in the polyurethane in an amount of several to several tens percent by weight. On the basis of this finding, the present invention has been accomplished.

SUMMARY OF THE INVENTION

An object of the present invention is to provide a polyurethane which contains a specified oligomer to thereby enhance its conductivity and can be coated by electrostatic deposition.

The polyurethane having an improved conductivity according to the present invention is characterized by containing an oligomer of a molecular weight of at most 5,000, which has at least either urethane or urea bonds, is terminated with inactive groups and does not have any group reactive with alcoholic hydroxyl and isocyanate groups of raw materials for urethane preparation in its molecule, at most in an amount not to cause deterioration of the desired characteristics of the polyurethane.

BRIEF DESCRIPTION OF THE DRAWINGS

FIG. 2 is a graph showing the realtionship between the volume resistivity and oligomer concentration in one embodiment of the polyurethane having an improved conductivity of the present invention.

FIG. 3 is a graph showing the relationship between the volume resistivity and oligomer concentration in another embodiment of the polyurethane of the present invention.

DETAILED DESCRIPTION OF THE INVENTION

Figure 1:
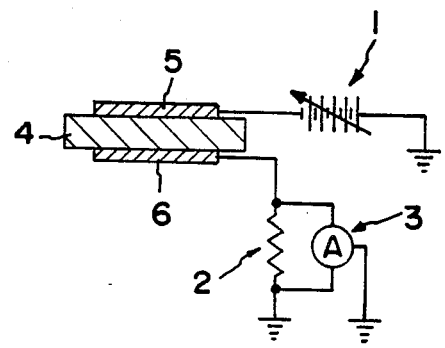
FIG. 1 shows an outline of a surface potential measuring apparatus.

Although the mechanism how an oligomer having at least either urethane or urea bonds can improve the conductivity of a polyurethane is not clear, it is thought that this oligomer acts as an impurity to thereby lower the resistance of a polyurethane, resulting in an enhanced conductivity. This can be approved by the fact that the conducitivity is all more enhanced with an increase in the oligomer concentration.

Since in the present invention the oligomer is mixed with the raw materials for urethane preparation, it is preferable that the oligomer does not have isocyanate or carboxyl groups which are reactive with alcoholic hydroxyl groups of raw materials for urethane preparation, nor hydroxy, amino or carboxyl groups which are reactive with isocyanate groups of the raw materials. Further, the oligomer is preferred to be terminated with inactive groups such as methyl, to prevent the polymerization reaction between the oligomers themselves.

The molecular weight of the oligomer to be used in the present invention is at most 5,000, preferably 95 to 5000 and most preferably 1000 to 4000, because an oligomer of a molecular weight of 5,000 which is originally contained in a polyurethane can hardly improve the conductivity of the polyurethane. The lower the molecular weight, the higher the effect of improving the conductivity. This is approved by the fact that 1,4-butanediol oligomer of a low polarity and a low molecular weight can improve the conductivity of a polyurethane more remarkably than ethylene glycol oligomer of a high polarity and a high molecular weight under the same conditions. Though it might be presumed that the higher the polarity, the better the conductivity, the molecular weight is thought to be more affective in improving the conductivity than the polarity. Though the number of urethane or urea bonds contained in the oligomer is not specifically limited, the oligomer preferably contains at least one of either.

The oligomer having urethane or urea bonds can be prepared by reacting a diisocyanate such as methylenediphenyl diisocyanate with a compound selected from among a dihydric alcohol (for example, ethylene glycol or 1,4-butanediol), a diamine and water, and a monohydric alcohol, for example, methanol.

Alternatively, the oligomer having urethane bonds can be prepared by reacting tolylene diisocyanate (TDI) with methanol and water, while the oligomer having urea bonds can be prepared by reacting TDI with methylamine and water. Additionally, the oligomer having both urethane and urea bonds can be prepared by reacting TDI with methylamine and water.

The amount of the oligomer to be added to the raw materials for urethane preparation is in the range where the desired characteristics of an article made of the polyurethane are not deteriorated, and preferably the largest amount in the above range, because the larger the amount, the higher the conductivity. Preferably, the amount is 0.5 to 20% by weight based on the weight of an article made of the polyurethane, more preferably 0.5 to 10% and most preferably 1.0 to 5.0%.

Generally, the oligomer is added to raw materials for urethane preparation according to either of the following two methods.

A. Direct addition of powdery oligomer

A prepared crystalline oligomer is pulverized to obtain a powdery oligomer. A mixture of the powdery oligomer and one of the raw materials for urethane preparation (which may be either polyol or isocyanate) is kneaded in a mixing roll to micro-disperse the powder in the material on the order of a molecule. The obtained mixed materials, that is to say, an oligomer-containing polyol or isocyanate material is reacted with isocyanate or polyol, respectively, and simultaneously molded.

B. Solvent method

A prepared oligomer is dissolved in a good solvent. A mixture of the obtained solution and one of the raw materials for urethane preparation (which may be either polyol or isocyanate) is stirred to compatibilize the material with the oligomer and the solvent. The obtained mixture is heated under a reduced pressure to remove the solvent, thus obtaining a solution comprising the oligomer and the raw material. The obtained solution comprising either polyol or isocyanate and the oligomer is reacted with the other component of the raw materials, that is to say, isocyanate or polyol, respectively, and simultaneously molded.

In any of the above methods, it is preferred that the oligomer is micro-dispersed in the raw material on the order of a molecule by the selection of the best conditions.

DESCRIPTION OF THE PREFERRED EMBODIMENT

Now, Examples will further illustrate the present invention, but the present invention is not limited to these Examples.

An oligomer represented by formula I:

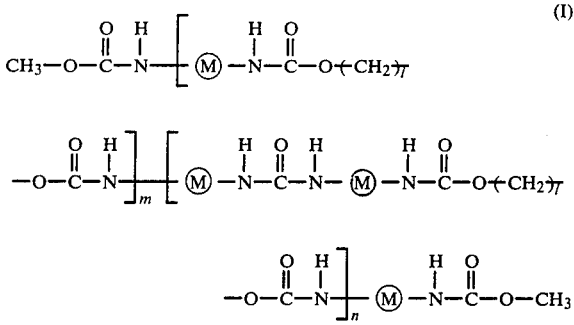

wherein Ⓜ stands for

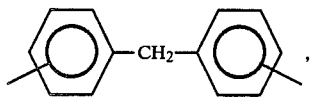

l stands for 2 or 4; m stands for about 5 and n stands for about 0.5 when l is 2; and m stands for about 4 and n stands for about 0.5 when l is 4, was prepared by the following procedure. A sufficient amount of ethylene glycol or 1,4-butanediol, which may contain a small amount of water, was added to methylenediphenyl diisocyanate (MDI). The obtained mixture was subjected to solution polymerization to prepare an oligomer terminated with NCO groups. Unreacted MDI monomers were removed from the polymerization mixture to obtain the oligomer. The oligomer was reacted with a large excess of methanol to obtain a solution of an oligomer with inactivated terminal groups in methanol. The solution was heated under reduced pressure to remove the methanol. A crystalline oligomer with inactivated terminal groups was obtained.

The crystalline oligomer represented by formula I was pulverized to obtain a powder. The powder was added to a solution containing a polyol in such an amount as to give a polyurethane elastomer containing 1.08 or 2.13% of the oligomer. Each obtained mixture was kneaded in a mixing roll and, thereafter, reacted with a solution containing the isocyanate to prepare a polyurethane. The amount of each component is shown in the following Table.

TABLE

| | Formulation [unit: g] | | | |
|---|---|---|---|---|
| | | Formulation No. | | |
| Components | | 1 | 2 | 3 |
| Solution containing polyol | polyol | 68.5 | 68.5 | 68.5 |
| | toner black | 8.5 | 8.5 | 8.5 |
| | 1,4-butane-diol | 23.0 | 23.0 | 23.0 |
| | dibutyltin dilaurate | 0.095 | 0.095 | 0.095 |
| | oligomer of formula I | 0 | 2.0 | 4.0 |
| Solution containing isocyanate | isocyanate | 83.7 | 83.7 | 83.7 |
| | Freon R-11 | 3.5 | 3.5 | 3.5 |
| Concentration of the oligomer of formula I in obtained polyurethane (wt %) | | 0 | 1.08 | 2.13 |

Polyurethanes were prepared using oligomers represented by formula I wherein l was 2 and 4, respectively, according to Formulation Nos. 2 and 3. The volume resistivities of the obtained polyurethanes were measured by a surface potential measuring apparatus.

An outline of a surface potential measuring apparatus is shown in FIG. 1, wherein 1 is an electric source, 2 is a resister, 3 is an ammeter, 4 is a sample, and 5 and 6 are aluminum foils. Sample 4 of 100 mm in length as well as in breadth and 3 mm in thickness was held between aluminum foils 5 and 6 of 50 mm in length and in breadth, and a voltage was impressed on the sample at 20° C. and a humidity of 65% to record the obtained electrical current value. On the basis of the relation: $R(\Omega)=$impressed voltage/electrical current, a volume resistivity $\rho$ was calculated from the relation: $\rho(\Omega\cdot cm) = R \times S/l$ wherein S is a contact area between the sample and the aluminum foils and l is a thickness of the sample.

As a control, a polyurethane prepared according to Formulation No. 1 in the Table and containing no oligomer of the present invention was examined under the same conditions to calculate its volume resistivity.

FIGS. 2 and 3 show changes in the conductivity of the polyurethanes prepared in Example. In each Figure, the ordinate refers to the volume resistivity [Ω·cm] (represented logarithmically), while the abscissa refers to the oligomer concentration in the polyurethane of the present invention. FIG. 2 shows the Example using an oligomer represented by formula I wherein l is 2, while FIG. 3 shows the Example using an oligomer represented by formula I wherein l is 4. In FIGS. 2 and 3, the volume resistivity of the polyurethane of an oligomer content of 0 was determined using the polyurethane prepared according to Formulation No. 1 in the Table (control).

From the Figures, it should be understood that the volume resistivity of the polyurethane of the present invention is extremely low as compared with that of the control, thus enhancing the conductivity. Additionally, it should be understood that the volume resistivity decreases to result in an enhanced conductivity with an increase in the oligomer content, and that the conductivity is increasingly improved with an increase in the impressed voltage.

As described above, the conductivity of a molding made of the polyurethane of the present invention is higher than that of a molding made of conventional polyurethane, owing to the presence of the conductivity-enhancing oligomer, so that the obtained molding hardly generates static electricity and can be easily coated by electrostatic deposition.

What is claimed is:

1. A polyurethane having an improved conductivity, which contains an oligomer of a molecular weight of at most 5,000, which has at least either urethane or urea bonds, is terminated with inactive groups and does not have any group reactive with alcoholic hydroxyl and isocyanate groups of raw materials for urethane preparation in its molecule, at most in an amount not to cause deterioration of the desired characteristics of the polyurethane.

2. The polyurethane having improved conductivity as set forth in claim 1, wherein the inactive groups are methyl groups.

3. The polyurethane having improved conductivity as set forth in claim 1, wherein the reactive groups not present in the molecular structure of the oligomer are isocyanate, carboxyl, hydroxyl and amino groups.

4. The polyurethane having improved conductivity as set forth in claim 1, containing about 1 to 2% by weight of the oligomer.

5. An oligomer represented by formula I:

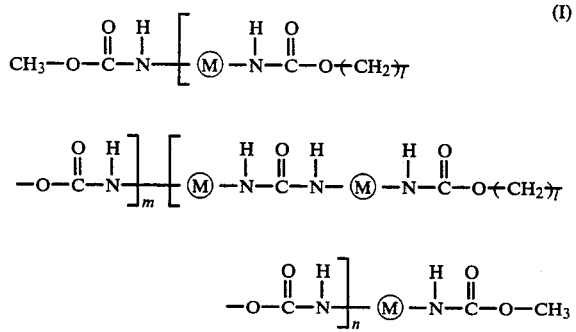

wherein Ⓜ stands for

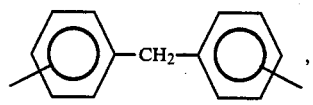

l stands for 2 or 4; m stands for about 5 and n stands for about 0.5 when l is 2; and m stands for about 4 and n stands for about 0.5 when l is 4.

6. A process for the preparation of a polyurethane having improved conductivity, which comprises kneading together an oligomer as set forth in claim 1, in powder form and one component of a raw material for urethane preparation with a kneader such as a mixing roll to form a mixture, followed by the reaction between the above mixture and the other component of said raw material for urethane preparation.

7. A process for the preparation of a polyurethane having improved conductivity which comprises dissolving the oligomer of claim 1 and one component of a raw material for urethane preparation in a solvent and heating the resulting mixture under reduced pressure to remove the solvent, followed by the reaction between the solvent free product and the other component of said raw material for urethane preparation.

8. A process for the preparation of the oligomer of claim 5, which comprises reacting methylene-diphenyl diisocyanate with a sufficient amount of ethylene glycol or 1,4-butanediol, removing unreacted methylene-diphenyl diisocyanate monomer from the reaction mixture and crystallizing the obtained oligomer from a large excess of methanol which is sufficient for dissolution and crystallization of said oligomer.

9. A polyurethane having improved conductivity which contains an oligomer having a molecular weight of no more than 5,000, which has at least either urethane or urea bonds in the molecular structure in an amount effective to increase conductivity, and wherein said oligomer is terminated with inactive groups and does not contain any groups which are capable of reacting with the alcoholic hydroxyl and isocyanate groups of raw materials which are used in the preparation of urethane.

* * * * *